United States Patent
Clark

(10) Patent No.: US 6,741,569 B1
(45) Date of Patent: May 25, 2004

(54) QUALITY OF SERVICE MONITOR FOR MULTIMEDIA COMMUNICATIONS SYSTEM

(75) Inventor: Alan Douglas Clark, Duluth, GA (US)

(73) Assignee: Telchemy, Incorporated, Duluth, GA (US)

( * ) Notice: Subject to any disclaimer, the term of this patent is extended or adjusted under 35 U.S.C. 154(b) by 0 days.

(21) Appl. No.: 09/551,498

(22) Filed: Apr. 18, 2000

(51) Int. Cl.[7] .................. G01R 31/08; H04L 12/66; H04L 12/28
(52) U.S. Cl. ............... 370/252; 370/352; 370/356; 370/401; 455/67.1
(58) Field of Search ................. 370/230, 235, 370/252, 259, 229, 260, 255, 333, 394, 389, 352–357, 469, 466, 401, 516, 517; 455/414, 67.1; 379/88.13, 88.17, 202.01, 201.01; 704/200, 206; 375/228, 224; 709/230–235

(56) References Cited

U.S. PATENT DOCUMENTS

| | | | |
|---|---|---|---|
| 5,710,791 A | | 1/1998 | Royer |
| 5,768,527 A | * | 6/1998 | Zhu et al. ............... 395/200.61 |
| 5,867,813 A | | 2/1999 | Di Pietro |
| 5,961,599 A | * | 10/1999 | Kalavade et al. ........... 709/224 |
| 6,363,053 B1 | * | 3/2002 | Schuster et al. ........... 370/230 |
| 6,512,746 B1 | * | 1/2003 | Sand ......................... 370/252 |

FOREIGN PATENT DOCUMENTS

EP        0579472 A        1/1994

OTHER PUBLICATIONS

Dempsey, B. J. et al., "An empirical study of packet voice distribution over a campus–wide network", Local Computer Networks, 1994. Proceedings., 19th Conference on Minneapolis, MN, USA Oct. 2–5, 1994, Los Alamitos, CA, USA, IEEE Comput. Soc, Oct. 2, 1994, pp. 456–465, XP010128901.

Rubin, I. Et al., "voice quality control under dynamic encoding algorithms in ATM networks", Computer Networks and ISDN Systems, North Holland Publishing. Amsterdam, NL, vol. 29, No. 3, Fet. 1, 1997, pp. 343–355, XP004053982.

Sallent, O. et al., "An efficient data transmission policy in an integrated voice–data DS–CDMA network", Vehiclar Technology Conference, 1998. VTC 98. 48th IEEE Ottawa, Ont., Canada May 18–21, 1998, New York, NY, USA, IEEE, US May 18, 1998, pp. 2393–2397, XP010288196.

Douskalis, IP Telephony, Chapter 4, Prentice Hall 2000.

Johannesson, The FTSI Computational Model IEEE Comms. Magazine, Jan. 1997, pp 70–79.

Cermak, Speech Quality as a Function of IP Network Performanc, T1 Committee Contribution T1A1, 7/98–022, Jun. 1998, www.tl.org.

Cermak, Voice Over IP Speech Quality, T1 Committee Contribution T1a1.7/00–011, May 1999.

ECTEL, Qualinet Product Information www.ectel.com.

Netrue, NetrveQos Product Information www.netrue.com.

* cited by examiner

Primary Examiner—Duc Ho
(74) Attorney, Agent, or Firm—Smith, Gambrell & Russell, LLP

(57) ABSTRACT

A subjective quality monitoring system for packet based multimedia signal transmission systems estimates the parameters of a statistical model representing the probabilities of said packet based transmission system being in a low loss state or a high loss state and uses said estimates to predict the subjective quality of the multimedia signal. The quality monitoring system comprises a plurality of quality monitoring functions located at the multimedia to packet conversion points.

19 Claims, 7 Drawing Sheets

Packet Voice Conversion Point containing
a Voice Quality Monitoring System

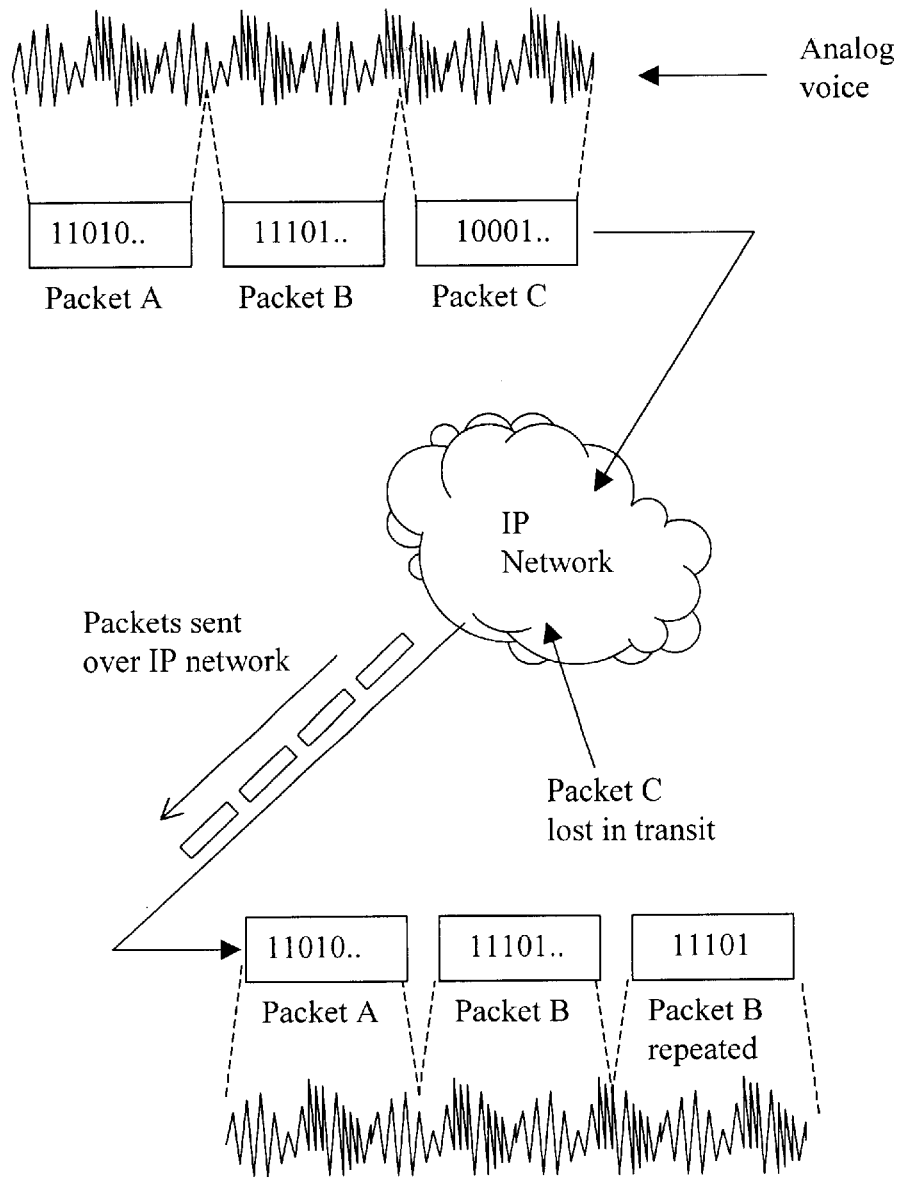
Figure 1 - Illustrative example of the effects of packet loss in a packet voice system

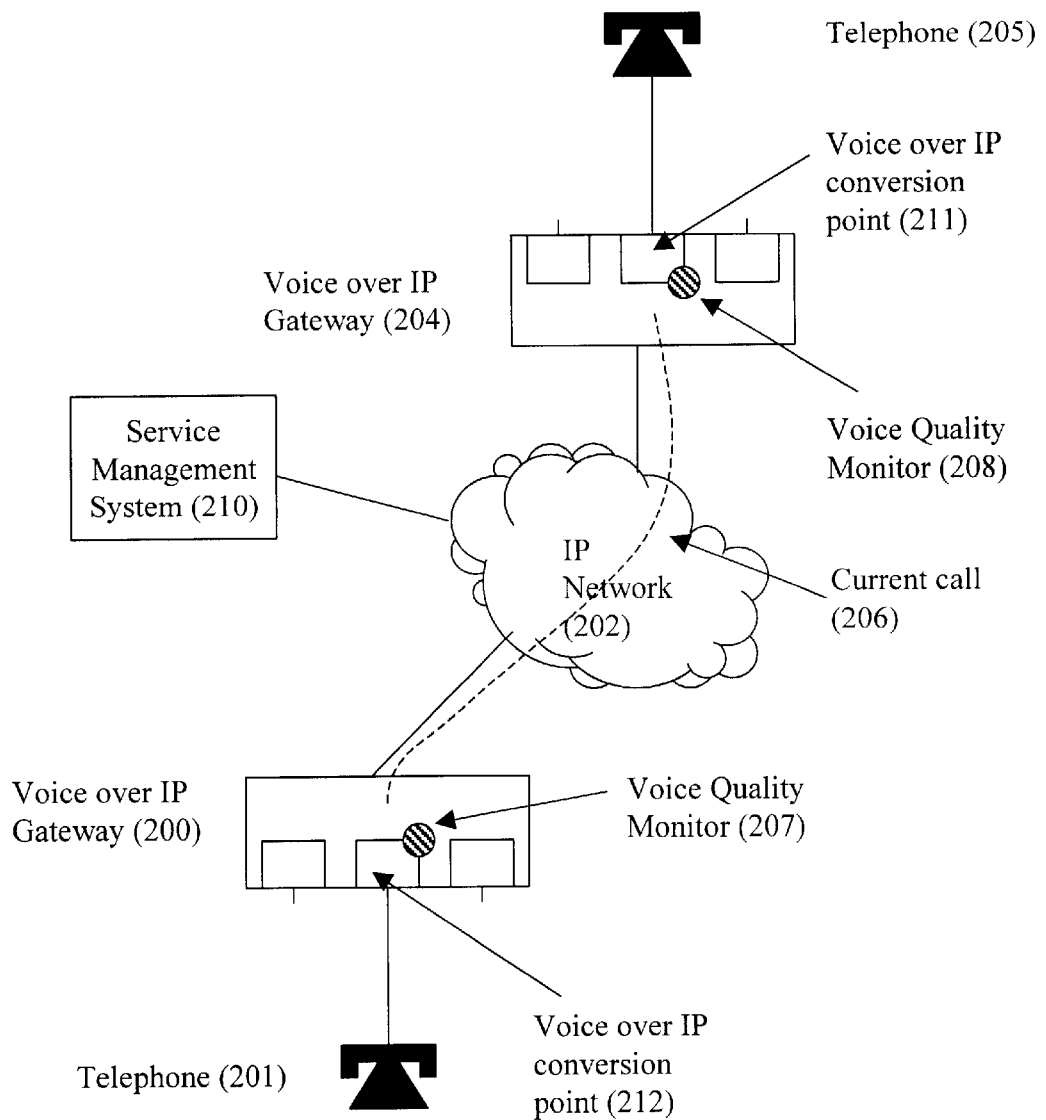
Figure 2 - Example of a packet voice network containing the Voice Quality Monitoring System

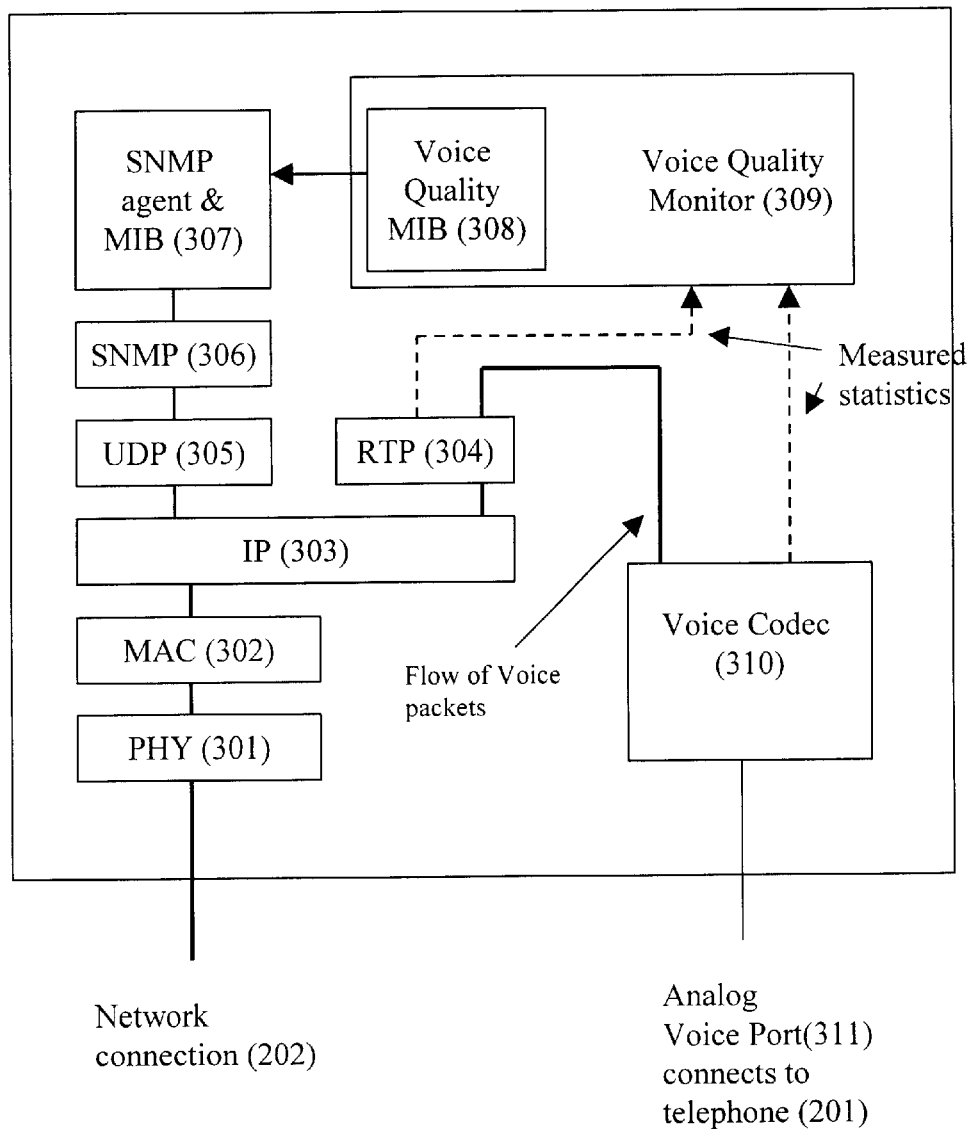
Figure 3 - Packet Voice Conversion Point containing a Voice Quality Monitoring System

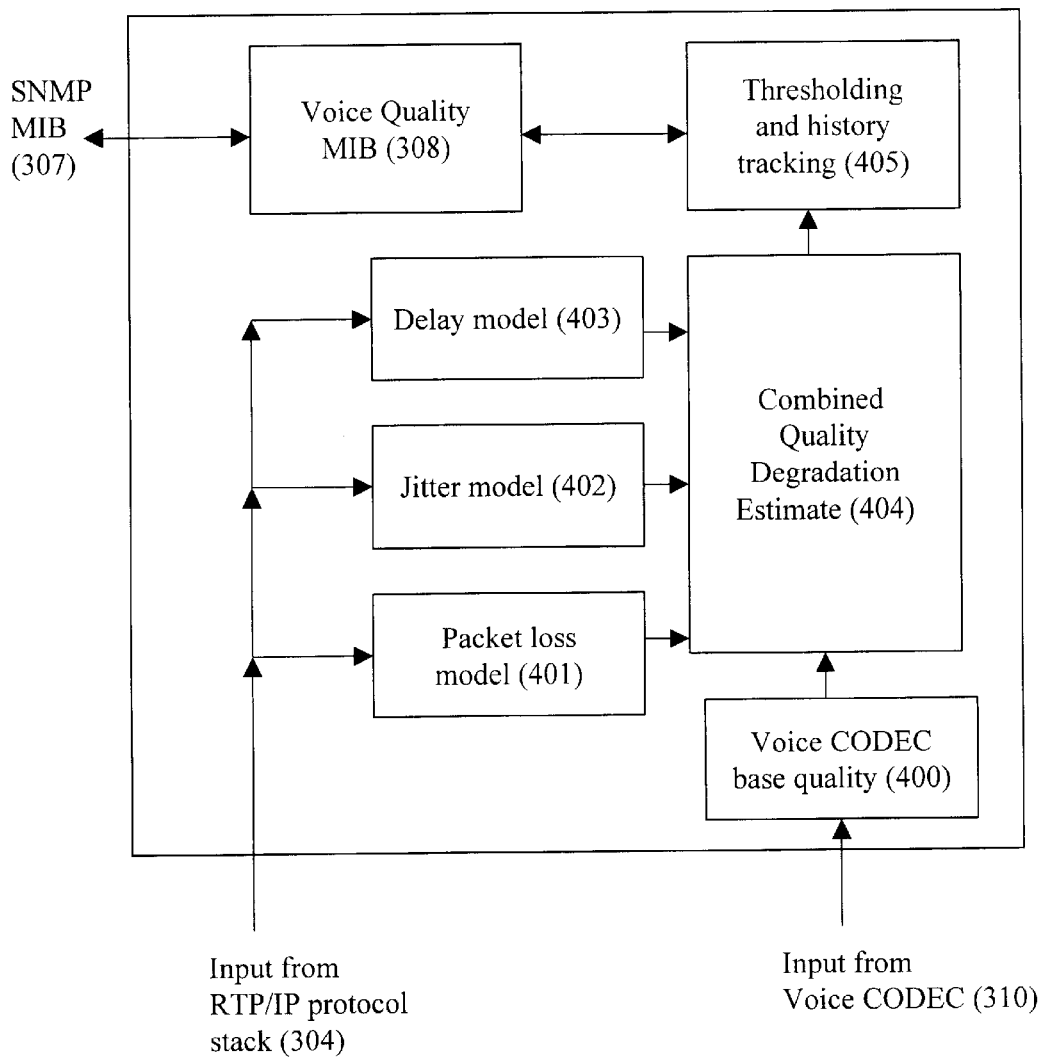
Figure 4 - Voice Quality Monitoring System

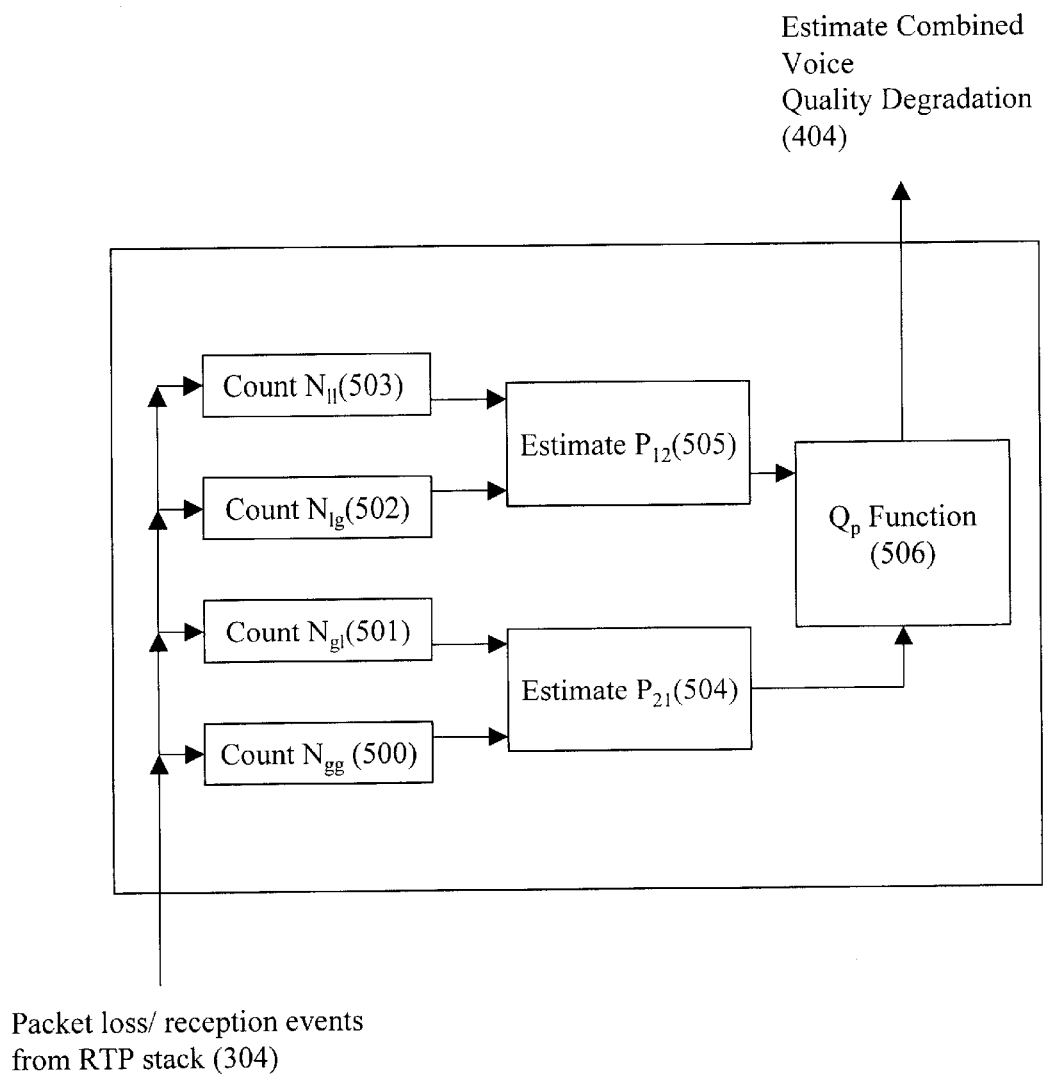
**Figure 5 - Voice Quality Monitoring System
- Packet Loss Model Subsystem**

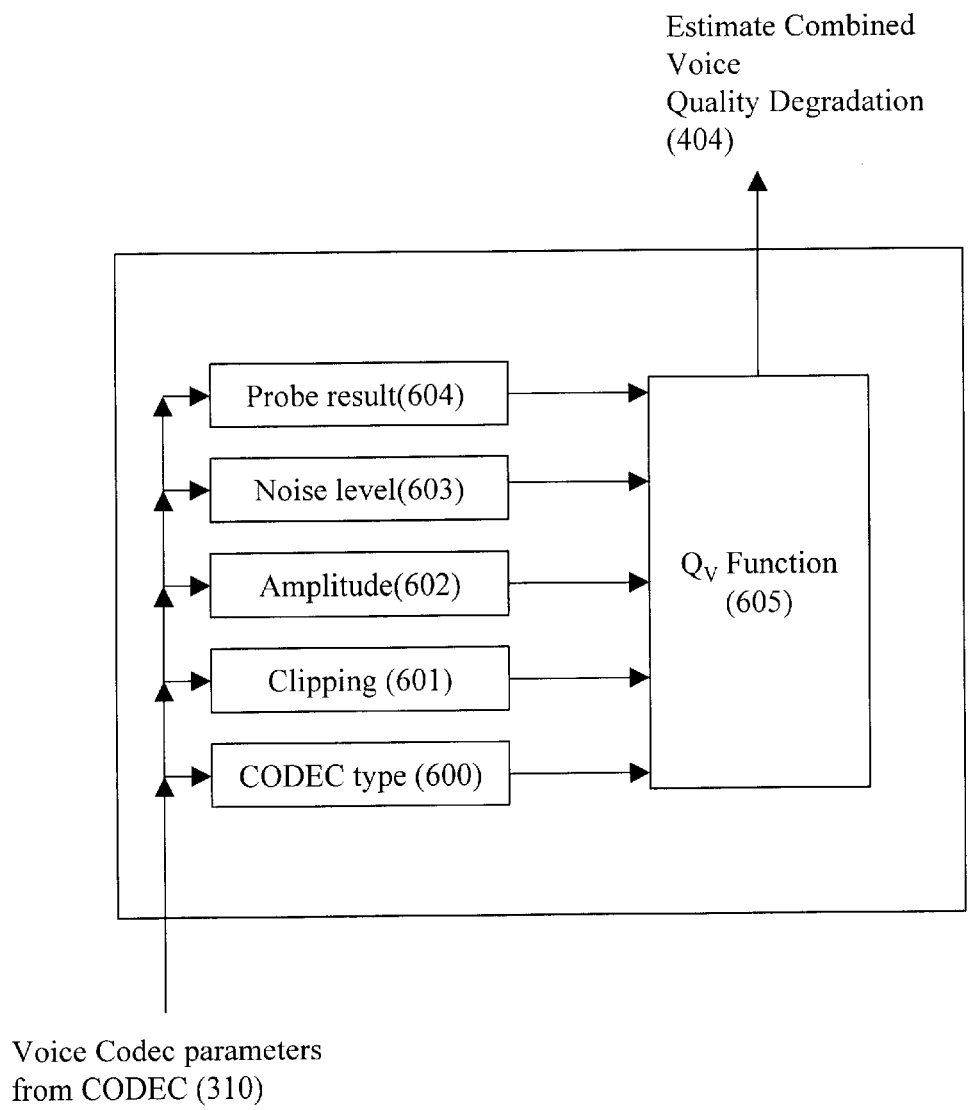
Figure 6 - Voice Quality Monitoring System
- Voice CODEC Model Subsystem

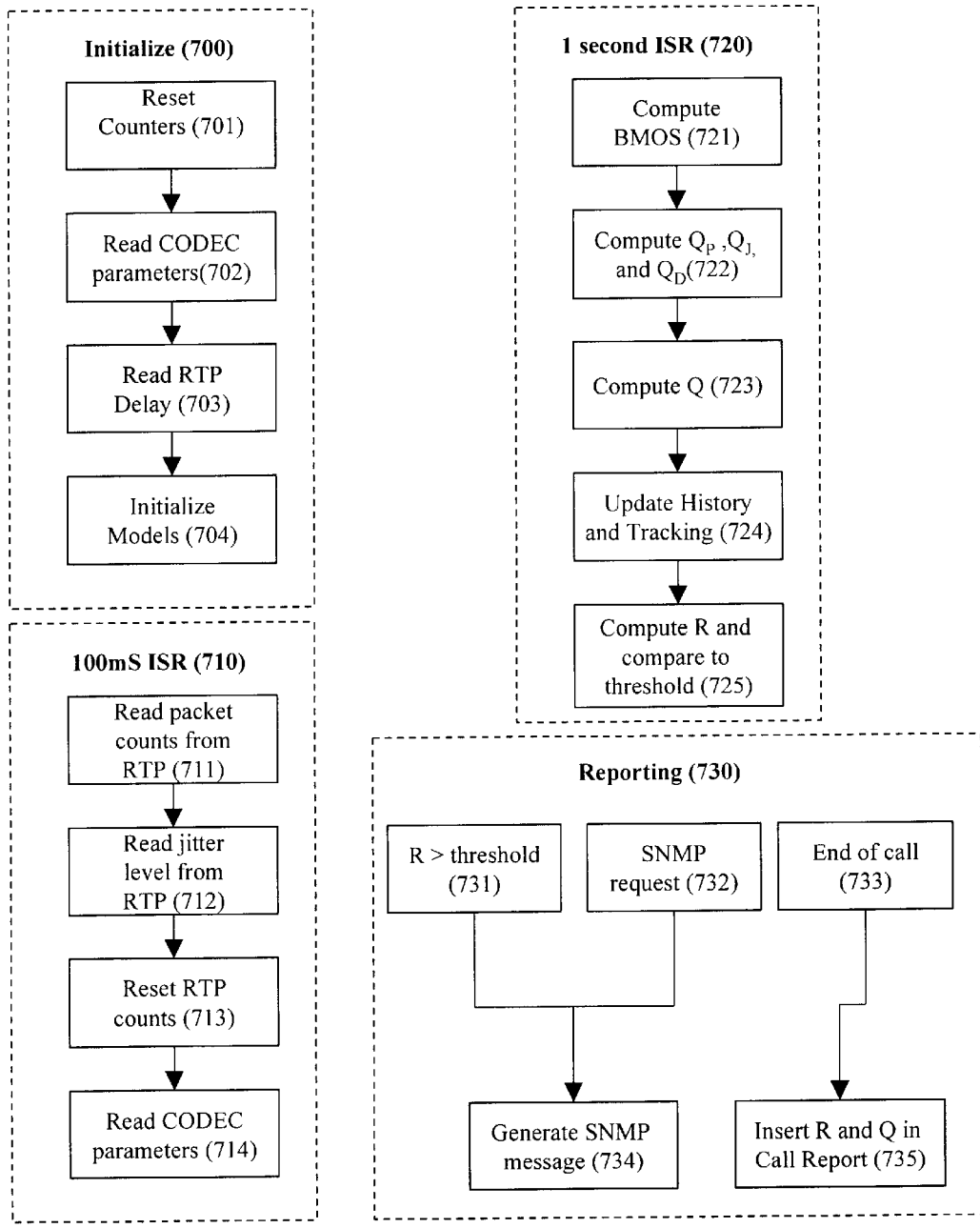
**Figure 7 - Voice Quality Monitoring System
- Flowchart of major functions**

QUALITY OF SERVICE MONITOR FOR MULTIMEDIA COMMUNICATIONS SYSTEM

BACKGROUND

1. Field of Invention

This invention relates to methods of estimating the subjective quality of a multimedia communications system in which audio, voice or video is digitized, compressed, formed into packets, transmitted over a packet network and then re-assembled and decoded by a receiving system. Typical packet networks cause some packets to be lost or delayed which results in the quality of the decoded audio, voice or video being degraded and it is accordingly desirable to have some means of measuring or estimating the subjective or perceptual quality of the decoded audio, voice or video.

Emerging packet based voice networks, using technology such as Voice over IP (Internet Protocol), provide a more flexible and lower cost alternative to traditional telecommunications networks. They do however introduce some problems, notably increased variation in user perceived speech quality due to network impairments. The present invention relates to methods for estimating this variation in user perceived quality.

A Voice over IP system comprises two or more conversion points and a connecting network. A conversion point is a device that converts analog voice into packet format suitable for transmission over a network. A conversion point may be a device within a telephone switching system, a packet voice telephone, a personal computer running an applications program or other types of device. The following brief description may be referenced to the illustrative diagram shown in FIG. 1. At each conversion point the analog voice signal from the user's telephone is converted to a digital form, divided into short segments, compressed, placed into an IP packet and then transmitted over the connecting network to the remote conversion point. Received voice packets are uncompressed, converted back to analog form and played to the user as an audible signal.

The connecting network relays the IP packets from one conversion point to another. The network is a shared resource and is carrying many other streams of packet data. This means that any given packet may be subject to impairments, for example:

(i) Delay, in which the time for the packet to get from one conversion point to the other conversion point causes delays in the apparent response from one user to the other (ii) Packet loss, in which some of the packets are lost or arrive so late that they are discarded (iii) Jitter, in which the arrival time of the packets varies (iv) Distortion, due largely to the voice compression algorithm in use.

These impairments collectively cause the user perceived voice quality to vary considerably and hence Voice over IP service providers need a method for estimating the quality of service provided by their network (Voice Quality of Service).

2. Description of Prior Art

Prior art systems for measuring voice quality, as described by Douskalis (Hewlett Packard 2000), Royer (U.S. Pat. No. 5,710,791) and Di Pietro (U.S. Pat. No. 5,867,813), use centralized test equipment which samples the voice quality from various conversion points. A loop back condition is established at an conversion point, the test equipment transmits a known signal and then compares the received (looped back) signal with the original, thereby estimating delay, distortion and other impairments. This approach provides an accurate measure of voice distortion but only provides this measure for a sample conversion point and under the network conditions that existed at the time of the test. This approach is undesirable for continuous network monitoring as the frequent transmission of test messages increases the traffic in the network and reduces network performance.

Another approach currently used for estimating voice quality is to estimate the subjective performance of the voice connection using objectively measured parameters. Models such as the E-Model described by Johannesson, (IEEE Communications Magazine 1997), are able to produce R ratings which can be correlated to user perceived voice quality. This process is applied by a central management system which gathers statistics on noise and delay and then produces an estimate of voice quality. This method as described by Johannesson does not consider impairments typical of packets systems.

Experimental measurements of the effects of network impairments on packet voice quality are reported by Cermak (T1A1 contributions May 1999 and June 1998). Cermak considered the effects of average packet loss but did not consider the effects of the time varying nature of impairments on subjective quality.

The Quali.Net system marketed by ECTel comprises a central test system with additional remote test units. The remote test units are complex units that contain dedicated electronic circuitry and software and are constructed as separate items of test equipment that are externally attached to a Voice over IP system. The remote test units estimate voice quality on selected voice connections and report this to the central test system for diagnostic purposes. The high cost of these remote test units means that it is prohibitively expensive to install one for every voice connection and therefore only a small number are typically employed within a network. The Quali.Net system does not contain a statistical modeling process that analyses the burst nature of packet loss and its effects on subjective voice quality. The Quali.Net system does not compute the estimated subjective voice quality within the Voice over IP end system, cannot effectively monitor the voice quality at every port simultaneously and cannot provide per-call voice quality information that can be recorded within a call record database The NeTrueQoS system marketed by NeTrue comprises a central test system with remote software agents. The software agents gather network statistics and report packet loss, jitter and delay back to the central system which computes an estimated voice quality. Said software agents are located within a Voice over IP Node, which comprises a piece of equipment that supports multiple Voice over IP ports. The NeTrueQoS system does not contain a statistical modeling process that analyses the burst nature of packet loss and its effects on subjective voice quality. The NeTrueQoS system does not compute the estimated subjective voice quality within the Voice over IP end system and therefore cannot effectively monitor the voice quality at every port simultaneously and cannot provide per-call voice quality information that can be recorded within a call record database.

Prior art systems for estimating voice quality based on measurements of network performance therefore suffer from a number of drawbacks:

(i) The use of the statistics gathered independently over a period of time does not reflect the time correlation between the statistics. If a high level of jitter coincides in time with a high level of packet loss then this will have a different subjective effect to the same impairments occurring at different times. Prior art centralized systems for estimating voice quality based on network statistics do not precisely correlate the times at which impairments occur and therefore do not accurately estimate voice quality.

(ii) Typical voice coding algorithms employed in packet voice systems compensate for lost packets by repeating the last packet, estimating the content of the lost packet or inserting noise. For single lost packets this approach is very effective and voice quality affected only slightly. When more than one subsequent packet is lost the voice coding algorithm will replay the last received packet multiple times, which is much more noticeable to the user. Prior art systems do not represent the way that bursts of lost packets affect voice quality and therefore do not accurately estimate voice quality.

Prior art systems for estimating voice quality do not properly support Service Level Agreements. Telephone service providers employing Voice over IP technology are desirous of offering Service Level Agreements in which they provide guarantees of voice quality, network availability and price. In order to properly implement such Service Level Agreements it is preferable to monitor every call and to record information on voice quality within call records.

Prior art systems do not support packet video systems, which also suffer from similar degradation due to the inability of the video decoder to filly reconstruct an image if the data is incomplete. Video compression systems typically employ motion coding in which the differences between an image and the previous image are transmitted. Errors can therefore be propagated through a series of subsequent images. The subjective effects of packet loss depend on the statistical distribution of lost packets and therefore it is desirable to consider the likely frequency of occurrence of multiple successive lost packets when estimating subjective video quality Accordingly there is a need to provide a method of estimating subjective voice quality within a packet voice system that incorporates means of determining the loss in subjective quality due to a high rate of packet loss within a short time period.

Furthermore there is a need to provide a method of estimating subjective image quality within a packet video system that incorporates means of determining the loss in subjective quality due to a high rate of packet loss within a short time period.

Furthermore there is a need to provide a means of estimating subjective quality within a packet multimedia communications system that can determine said estimated subjective quality for every multimedia call in progress.

Furthermore there is a need to provide a means of estimating subjective quality within a packet multimedia communications system that can determine said estimated subjective quality for every multimedia call in progress and record said subjective quality within a call record database.

Furthermore there is a need to provide a means of estimating subjective quality within a packet multimedia communications system that is of low implementation complexity and can be installed in the form of a software addition to existing Voice over IP end systems.

SUMMARY

The present invention provides an improved means of estimating subjective quality in packet multimedia communications systems wherein said communications system is presumed to have a low packet loss state and one or more high packet loss states and the statistical distribution of time spent in each state is determined thereby to predict the degradation in subjective quality caused by said packet loss and this information is combined with estimated degradation in subjective quality due to other communications system impairments in order to provide an estimated subjective quality measure for said multimedia communications system.

OBJECTS AND ADVANTAGES

Accordingly, besides the objects and advantages of the present invention described above, several objects and advantages of the present invention are:

(a) to provide a method for estimating the subjective or perceptual quality of a multimedia communications system which considers the effects of "bursty" packet loss or short periods of high packet loss interspersed with periods of low or zero packet loss;

(b) to provide a method for estimating the subjective or perceptual quality of a multimedia communications system which considers the relative time at which different measured network impairments occur;

(c) to provide a distributed system for estimating the subjective or perceptual quality of a multimedia communications system at the conversion points of the multimedia communications system;

(d) to provide a distributed system for estimating the subjective or perceptual quality of a multimedia communications system which does not increase network traffic by requiring test messages to be sent in order to perform said estimation process;

(e) to provide a distributed system for estimating the subjective or perceptual quality of a multimedia communications system in which the subjective or perceptual quality is estimated on a per call basis and incorporated into a call record;

(f) to provide a method for estimating the subjective or perceptual quality of a packet voice connection;

(g) to provide a method for estimating the subjective or perceptual quality of a packet video connection;

Further objects and advantages are to provide a method of estimating subjective quality for an audio or video streaming system in which packetized audio or video is broadcast or multicast through a packet network and for a multimedia conferencing system. Still further objects and advantages will become apparent from consideration of the ensuing description and drawings.

DRAWING FIGURES

Embodiments of the invention (the Voice Quality Monitor) are described below by way of example only with reference to FIGS. 1 to 6 of the accompanying drawings, of which:

FIG. 1 illustrates the effects of lost packets on a packet voice system.

FIG. 2 shows a packet voice system containing several types of conversion point

FIG. 3 shows a packet voice conversion point system containing a Voice Quality Monitor as described herein FIG. 4 shows the architecture of the Voice Quality Monitor as described herein FIG. 5 shows the basic structure of the Packet Loss Model subsystem of the Voice Quality Monitor as described herein FIG. 6 shows the structure of the Voice CODEC Model subsystem of the Voice Quality Monitor as described herein FIG. 7 shows a flowchart of the basic operations of the Voice Quality Monitor

DESCRIPTION

Preferred Embodiment

A preferred embodiment of the present invention is shown in FIGS. 4 to 5 and the application of the present invention within a multimedia communications system is shown in FIGS. 2 to 3.

FIG. 2 shows a typical Voice over IP network and illustrates the application of the present invention. A Voice over IP Gateway (200) connects to an IP network (202). A telephone (201) connects to a Voice over IP conversion point or port (203) contained in Voice over IP Gateway (200). A second Voice over IP Gateway (204) connects to IP network (202). A second telephone (205) connects to a second Voice over IP conversion point or port (209) contained in Voice over IP Gateway (204). A Voice Quality Monitor (207) is embedded into port (203) of Gateway (200) and a second Voice Quality Monitor (208) is embedded into port (209) of Gateway (204). Voice Quality Monitors (207) and (208) gather statistics related to call (206) currently in process between telephone (201) and telephone (205). Service Management System (210) is connected to IP Network (202) and thereby to Voice Quality Monitors (207) and (208) from which it is able to retrieve information.

FIG. 3 shows the basic structure of a packet voice end system in which a Voice Quality Monitor is embedded and illustrates the application of the present invention. IP Network (202) connects to a Physical Layer Interface or PHY (301) which in turn connects to a Medium Access Control or MAC (302) protocol layer. These terms are commonly used in the industry and their meaning and usage will be clear to practitioners in the field of networking. MAC layer (302) connects to an Internet Protocol or IP layer (303). IP layer (303) connects to a Real Time Protocol or RTP layer (304) and to a Simple Network Management Protocol or SNMP layer (306) via a User Datagram Protocol or UDP layer (305). RTP layer (304) connects to a Voice CODEC (310) which connects in turn to an Analog Voice Port (311) and to an attached telephone (201). SNMP layer (306) connects to SNMP Agent and MIB (307). MIB (307) is extended to encompass voice quality parameters through a connection with a Voice Quality MIB (308). A Voice Quality Monitor (309) containing the Voice Quality MIB (308) is connected to RTP layer (304) and Voice CODEC (310).

FIG. 4 shows the structure of Voice Quality Monitor (309) in more detail. An input from RTP layer (304) is connected to a Packet Loss Model (401) and to a Jitter Model (402) and to a Delay Model (403). The outputs from Packet Loss Model (401) and from Jitter Model (402) and from Delay Model (403) are connected to a Combined Quality Degradation Estimate function (404) via a Voice CODEC Base Quality Model (400). An input from Voice CODEC (310) is connected to Combined Quality Degradation Estimate function (404). The output from Combined Quality Degradation Estimate function (404) is connected to a Thresholding and History Tracking function (405). Threshold and History Tracking function (405) is connected to a Voice Quality MIB (308). Voice Quality MIB (308) is connected to SNMP MIB (307).

FIG. 5 shows the structure of Packet Loss Model (401) in more detail. Information on numbers of packets correctly received or lost is reported by RTP layer (304) at regular intervals, counted by a series of Counters and used to determine an estimate of voice quality degradation. The input from RTP layer (304) is connected to a first Counter $N_{gg}$ (500) and to a second Counter $N_{gl}$ (501) and to a third Counter $N_{lg}$ (502) and to a fourth Counter $N_{ll}$ (503). The outputs from Counters $N_{gg}$ (500) and $N_{gl}$ (501) are connected to an Estimate $P_{l2}$ function (504) which estimates the probability of the packet connection switching from a good state to a loss state. The outputs from Counters $N_{lg}$ (502) and $N_{ll}$ (503) are connected to an Estimate $P_{2l}$ function (505) which estimates the probability of the packet connection switching from a loss state to a good state. Estimate $P_{2l}$ (504) and Estimate $P_{l2}$ (505) functions are connected to a $Q_p$ function (506) which determines the voice quality degradation due to the estimated packet loss characteristics. $Q_p$ function (506) outputs the estimated voice quality degradation to Combined Quality Degradation Estimate function (404).

FIG. 6. shows the structure of the Voice CODEC Model (400) in more detail. Information on the type of voice coding algorithm and certain parameters measured during a call are passed to a series of functions each of which estimate a specific effect on subjective voice quality. CODEC (310) connects to a CODEC type function (600) and to a Clipping function (601) and to an Amplitude function (602) and to a Noise Level function (603) and to a Probe Result function (604). The output from functions (600), (601), (602), (603) and (604) are connected to a $Q_v$ function (605). The output from Qv function (605) is connected to Combined Quality Degradation Estimate function (404).

FIG. 7. shows a flowchart of the principal operations of Voice Quality Monitor (309). The sequence of steps contained in the flowchart will be explained in detail during the description of the operation of the present invention contained herein. The flowchart contains four sets of sequential operations. A first set of operations (700) is performed at the start of a new call and essentially comprise the computation of certain parameters that will remain approximately constant during said call. A second set of operations (710) is performed at frequent and regular intervals such as 100 milliseconds and essentially comprise the updating of counters 500 to 503. A third set of operations (720) is performed at regular intervals such as 1 second and essentially comprise the computation of certain voice quality parameters according to the description contained herein. A fourth set of operations (730) is performed on receipt of a request from Service Management System (210) and at the termination of a call.

Description of Operation

In order to make the operation of the present invention clear and apparent it is useful to briefly outline the operation of the Voice over IP conversion point with reference to FIGS. 2 and 3.

According to the diagram shown in FIG. 2 Telephone (201) places a long distance call to Telephone (205). The analog voice path from Telephone (201) is connected to Voice over IP conversion point (203) contained in Voice over IP Gateway (200). Dialing information from telephone (201) causes Voice over IP Gateway (200) to establish a connection (206) through IP Network (202) to Voice over IP conversion point (209) contained in Voice over IP Gateway (204) and thereby to telephone (205). When connection (206) is established voice communications between Telephone (201) and Telephone (205) is provided by means of a packet voice connection between Voice over IP conversion point (203) and Voice over IP conversion point (209).

With reference to FIG. 3, for voice packets received from IP Network (202)—denoted the receiving direction. An arriving voice packet is received from IP Network (202) and passed through the PHY layer (301) and MAC layer (302) to the IP layer (303). Packets are identified to permit IP layer (303) to determine where to route each packet. The arriving voice packet is passed to the RTP layer (304) at which point the contents of the packet, comprising a digitized compressed voice segment, is passed to Voice CODEC (310). RTP layer (304) identifies a time indicator in each received packet by which means it is able to assemble the packets into a proper sequence and determine if packets are delayed or missing. RTP layer (304) counts packets received and missing packets and determines at least the average, maximum and minimum delays. Voice CODEC (310) uncompresses or decodes the received voice segment, converts it back to analog form and plays it as an audible signal to Telephone (201).

The operation of the preferred embodiment of the present invention will now be explained with reference to FIGS. 3 to 7.

At the start of a new call Voice Quality Monitor (309) copies certain parameters from Voice CODEC (310) into CODEC type (600) including the type of CODEC in use, for example G.729A or G.723.1, and the jitter buffer level and the packet replacement algorithm. If Voice CODEC (310) conducts an initial line quality test or training procedure then the results of this line probing procedure are copied by Voice Quality Monitor (309) into Probe result (604). During the Voice over IP call establishment procedure the Voice over IP conversion point (203) sends and receives initial call setup packets and is thereby able to measure the round trip delay of the connection through IP Network (202). Voice Quality Monitor (309) copies the measured round trip delay from Voice over IP conversion point (203) to Delay Model (403). Voice Quality Monitor (309) resets all other variables and counters to zero, including Counters (500), (501), (502), (503). These steps are shown in FIG. 7 steps 701 to 704.

At regular and frequent intervals, for example 100 milliseconds, Voice Quality Monitor (309) performs the following actions (shown in FIG. 7 steps 711 to 714).:

(a) reads from RTP layer (304) R the count of the numbers of packets received and X the number of packets lost. Counters (500), (501), (502) and (503) are updated according to the following procedure:

```
If (R – X) > 5 and X < 2 then          {Low loss rate}
   if state = G then N_gg = N_gg + 1   {Counter (500)}
   if state = L then N_lg = N_lg + 1   {Counter (502)}
   state = G
else                                    {high loss rate}
   if state = G then N_gl = N_gl + 1   {Counter (501)}
   if state = L then N_ll = N_ll + 1   {Counter (503)}
   state = L
end if
```

(b) reads from RTP layer (304) the current average $J_{avg}$ jitter level expressed as an integer number of milliseconds and stores said parameters within Jitter Model (402)

(c) requests RTP layer (304) to reset its counters (d) reads from Voice CODEC (310) the background noise level expressed as a percentage of the maximum possible value and stores this parameter within Noise Level (603), and also reads the peak received voice amplitude expressed as a percentage of the maximum possible value and stores this percentage within Amplitude (602), and also determines if the received voice amplitude has reached the maximum allowable level and if so increments counter Clipping (601).

At regular intervals, for example 1 second, Voice Quality Monitor (309) computes an estimate of the received voice quality based on the statistics gathered during the preceding interval. The procedure for computing said estimate comprises the following five steps (shown in FIG. 7 steps 721 to 725):

(i) Voice CODEC quality degradation (400) is computed using the following procedure:

```
Define Base Quality as BMOS
If CODEC type = G.723.1 then BMOS = 4         {CODEC type (600)}
If CODEC type = G.729A then BMOS = 4.1
BMOS = BMOS – Clipping/20                     {Clipping (601)}
If Amplitude < 20% then BMOS = BMOS – 0.25    {Amplitude (602)}
BMOS = BMOS – Noise level/200                 {Noise level (603)}
```

(ii) Packet Loss quality degradation (401) is computed using the following procedure:

$$P_{12} = N_{gl}/(N_{gg} + N_{gl}) \quad \{P_{12}(504), N_{gg}(500), N_{gl}(501)\}$$
$$P_{21} = N_{lg}/(N_{ll} + N_{lg}) \quad \{P_{21}(505), N_{lg}(502), N_{ll}(501)\}$$
$$Q_P = 5\,P_{12}\,(2 - P_{21}) \quad \{Q_P(506)\}$$

(iii) Voice quality degradation due to Jitter (402) is computed using the following procedure:

$$Q_J = (J + 0.025\,J^2)/500 \quad \{J \text{ is Jitter in milliseconds}\}$$

(iv) Voice quality degradation due to Delay (403) is computed using the following procedure:

$$Q_D = 0.0018\,D + (D/1000)^2 \quad \{D \text{ is delay in milliseconds}\}$$

(v) Combined Voice Quality Degradation estimate (404) is computed using the following procedure:
Q=BMOS−$Q_P$−$Q_J$−$Q_D$
If Q<0 then Q=0

The computed voice quality value Q is transferred to Thresholding and History Tracking function (405). The value of Q is stored within a historical list of predefined length contained within Voice Quality MIB (308) to permit later retrieval by Service Management System (210). The maximum, MaxQ, and minimum, MinQ, and average, AvQ, values of Q are determined within Voice Quality MIB (308) according to the following procedure:

Sample count N=N+1
TotalQ=TotalQ+Q
AvQ=TotalQ/N
If Q>MaxQ then MaxQ=Q
If Q<MinQ then MinQ=Q An Integrator R contained within Threshold and History Tracking function (405) is also updated according to the following procedure:

K is initialized to 100 on call establishment

K=4−Q

If K<0 then K=0

R=R−6K$^2$

If R<100 then R=R+1

The value of R is compared to a threshold value and an indication transferred to SNMP Agent (307) should the value of R be below said threshold value, according to FIG. 7 steps 731 and 734. In the preferred embodiment the value of said threshold value may be modified by Service Management System (210) and is by default 20.

At any time during a call Service Management System (210) may transmit an SNMP message to SNMP Agent (307) to request an immediate report of voice quality. On receipt of such a message SNMP Agent (307) reads the current values of maximum, minimum and average Q, and R voice quality estimates and incorporates these values into an SNMP message which is transmitted back to Service Management System (210) according to FIG. 7 steps 732 and 734.

At any time during a call Voice Quality Monitor (309) may request RTP layer (304) to insert a representation of current voice quality parameters Q and R into a transmitted voice packet in order that congestion management functions within IP Network (202) can be continually informed of voice quality without requiring additional packets to be sent.

At the completion of a call the Average and Minimum values of voice quality are transferred from Voice Quality MIB (308) into a call completion packet for transmission to Service Management System (210) wherein these values are retained in a database for later use.

As may be seen from the preceding description of operation the present invention provides a comprehensive estimate of voice quality without adding excessive complexity to the Voice over IP system and is accordingly economical to implement and deploy within such systems.

Alternative Embodiments

Other variations of a Voice Quality Monitor which achieve a similar result to the preferred embodiment are described below as illustrative of the wide variety of implementations that fall within the purview of the present invention.

Other packet loss models that can be employed to represent the possible states of the packet connection include, but are not limited to:

(i) A 2-state Markov process in which one state represents a low packet loss rate and the other state a high packet loss rate;

(ii) A 3-state Markov process in which one state represents a zero packet loss rate, a second state represents a low non-zero packet loss rate and a third state represents a high loss rate;

(iii) A probabilistic automata based learning model in which a higher order Markov model is dynamically constructed;

(iv) A renewal process which attempts to model the sequences of correctly received and lost packets using a Pareto, Hyperbolic or similar distribution;

(v) A neural network based algorithm which learns from the observed network impairments to predict the continuous behavior of the packet connection.

The parameters of the packet loss model and other measured impairments may be transmitted to a central management system for conversion to a voice quality factor.

Conclusion, Ramifications and Scope

One benefit of the present invention is that the statistical properties of impairments can be properly considered when estimating voice quality. For example, if the packets are lost in groups or sequences the subjective impact is greater than if packet losses occur individually. The Voice Quality Monitor is able to determine information about the distribution of packet loss and to use this information when estimating subjective voice quality.

A further benefit of the present invention is that the impairments that affect voice quality can be correlated to give a more complete picture of user perceived quality. For example, if jitter and packet loss occur within the same time period then this results in a different subjective quality than if the impairments occur within different time periods.

A further benefit of the present invention is that the monitoring of voice quality can occur continuously at every conversion point in the network, whereas prior art systems adopt a sampling approach and can only provide a limited picture of the network performance.

Although the description above contains many specifities these should not be construed as limiting the scope of the invention but as merely providing illustrations of some of the presently preferred embodiments of this invention. For example, the packet network may use the Internet Protocol (IP), Asynchronous Transfer Mode (ATM), Frame Relay or other connection oriented or connectionless networking protocols and may use copper wire, optical fiber, wireless or other physical transmission media. The invention may be employed within a cellular telephone system with the voice quality monitor described herein located within the cellular telephone handset. The invention may be applied to synchronized streams of multimedia data and may for example detect loss of audio-video synchronization as an impairment. The invention may also be used in other applications than multimedia communications, for example any client-server application in which the efficiency and responsiveness of the communication between the client and the server is affected by the burstiness or non-uniformity in the time distribution of packet loss and other network impairments. The detailed description contains references to counters that are increased or decreased upon certain conditions and the same result may be achieved by using counters that are decreased or increased upon these same conditions.

Thus the scope of the invention should be determined by the appended claims and their legal equivalents, rather than by the examples given.

I claim:

1. A method for automatically estimating the subjective quality of a multimedia signal transmitted over a packet connection during a single call, comprising the steps of:

(a) during a single call determining the statistical distribution of the time spent by said packet connection in at least a low packet loss probability state and a high packet loss probability state, and (b) during that same single call determining the effect of said statistical distribution on the estimated subjective quality of said multimedia signal.

2. A method as defined in claim 1, further comprising the steps of:

(a) determining the level of one or more impairments, said one or more impairments being selected from the group consisting of jitter and delay and packet error rate and CODEC distortion, and (b) determining the estimated effect of said one or more impairments on the subjective quality of said multimedia signal.

3. A method as defined in claim 2, further comprising the step of reporting an estimated subjective quality to a central database system following the termination of said multimedia signal.

4. A method as defined in claim 2, further comprising the steps of comparing said estimated subjective quality to a threshold and sending an event message to a central management system if said subjective quality is below said threshold.

5. A method as defined in claim 2, further comprising the insertion of a representation of the estimated subjective quality of the received multimedia signal into transmitted voice packets.

6. A method as defined in claim 2, further comprising the periodic updating of a counter wherein:
   (i) when the estimated subjective quality is low, said counter is reduced by an amount dependent on said subjective quality, and
   (ii) when the estimated subjective quality is high, said counter is increased.

7. A system for automatically estimating the subjective quality of a multimedia signal transmitted over a packet network during a single call wherein the multimedia signal connects two or more multimedia signal to packet conversion points and one or more of said conversion points are physically grouped within an enclosure, comprising a plurality of quality monitors for performing monitoring functions wherein:
   (a) each of said functions, performed by said quality monitors one of said conversion points and each of said quality monitors is contained within the same enclosure as said conversion point;
   (b) each of said functions estimates the subjective quality resulting from the conversion of received packets to a multimedia signal performed by said conversion point during a single call.

8. A system as defined in claim 7, wherein the quality monitors for performing monitoring function
   (a) determines the statistical distribution of the time spent by said packet connection in at least a low packet loss probability state and a high packet loss probability state, and
   (b) determines the estimated effect of said statistical distribution on the subjective quality of said multimedia signal.

9. A system as defined in claim 8, wherein the quality monitors for performing monitoring function:
   (a) determines the level of one or more impairments, said one or more impairments being selected from the group consisting of jitter and delay and packet error rate and CODEC distortion, and
   (b) determines the estimated effect of said one or more impairments on the subjective quality of said multimedia signal.

10. A system as defined in claim 8, wherein the quality monitors for performing monitoring function reports the estimated subjective quality of the multimedia signal to a central database system following the termination of said multimedia signal.

11. A system as defined in claim 8, wherein the quality monitors for performing monitoring function compares the estimated subjective quality of the multimedia signal to a threshold and sends an event message to a central management system if said subjective quality is below said threshold.

12. A system as defined in claim 8, wherein the quality monitors for performing monitoring function inserts a representation of the estimated subjective quality of the received multimedia signal into transmitted voice packets.

13. A system as defined in claim 8, wherein the quality monitors for performing monitoring function contains a counter wherein:
   (a) when the estimated subjective quality is low, said counter is reduced by an amount dependent on said subjective quality, and
   (b) when the estimated subjective quality is high, said counter is increased.

14. A system for automatically estimating the subjective quality of a multimedia signal transmitted over a packet connection during a single call, comprising:
   (a) a means for determining the statistical distribution during a single call of the time spent by said packet connection in at least a low packet loss probability state and a high packet loss probability state, and
   (b) a means for determining the effect of said statistical distribution during that same single call on the estimated subjective quality of said multimedia signal.

15. A system as defined in claim 14, further comprising:
   (a) a means for determining the level of one or more impairments, said one or more impairments being selected from the group consisting of jitter and delay and packet error rate and CODEC distortion, and
   (b) a means for determining the estimated effect of said one or more impairments on the subjective quality of said multimedia signal.

16. A system as defined in claim 15, further comprising; a means for reporting an estimated subjective quality to a central database system following the termination of said multimedia signal.

17. A system as defined in claim 15, further comprising; a means for comparing said estimated subjective quality to a threshold and sending an event message to a central management system if said subjective quality is below said threshold.

18. A system as defined in claim 15, further comprising; a means for inserting a representation of the estimated subjective quality of the received multimedia signal into transmitted voice packets.

19. A system as defined in claim 15, further comprising; a means for periodically updating a counter wherein:
   (i) when the estimated subjective quality is low, said counter is reduced by an amount dependent on said subjective quality, and
   (ii) when the estimated subjective quality is high, said counter is increased.

* * * * *